United States Patent
McCracken

(10) Patent No.: US 8,261,215 B2
(45) Date of Patent: Sep. 4, 2012

(54) METHOD AND SYSTEM FOR PERFORMING CELL MODELING AND SELECTION

(75) Inventor: Thaddeus Clay McCracken, Portland, OR (US)

(73) Assignee: Cadence Design Systems, Inc., San Jose, CA (US)

( * ) Notice: Subject to any disclaimer, the term of this patent is extended or adjusted under 35 U.S.C. 154(b) by 273 days.

(21) Appl. No.: 12/342,039

(22) Filed: Dec. 22, 2008

(65) Prior Publication Data

US 2010/0162191 A1    Jun. 24, 2010

(51) Int. Cl.
*G06F 17/50* (2006.01)

(52) U.S. Cl. ......... 716/102; 716/101; 716/104; 716/111

(58) Field of Classification Search .................. 716/111, 716/102

See application file for complete search history.

(56) References Cited

U.S. PATENT DOCUMENTS

| | | | |
|---|---|---|---|
| 6,154,873 A | 11/2000 | Takahashi | |
| 6,330,707 B1 | 12/2001 | Shinomiya et al. | |
| 6,606,729 B2 * | 8/2003 | Gross et al. | 716/50 |
| 6,889,326 B1 | 5/2005 | Charbon et al. | |
| 6,901,562 B2 | 5/2005 | Cooke et al. | |
| 7,197,731 B2 | 3/2007 | Katayama | |
| 7,249,340 B2 | 7/2007 | Cooke et al. | |
| 7,356,784 B1 | 4/2008 | Dengi et al. | |
| 7,506,278 B1 | 3/2009 | Rjimati et al. | |
| 7,603,643 B2 | 10/2009 | McCracken et al. | |
| 7,933,748 B1 | 4/2011 | McCracken et al. | |
| 8,051,397 B2 | 11/2011 | McCracken et al. | |
| 8,095,898 B1 | 1/2012 | Wu et al. | |
| 2001/0018758 A1 * | 8/2001 | Tanaka et al. | 716/6 |
| 2003/0115564 A1 | 6/2003 | Chang et al. | |
| 2003/0131327 A1 | 7/2003 | Dervisoglu et al. | |
| 2003/0131330 A1 | 7/2003 | Downer et al. | |
| 2003/0200522 A1 | 10/2003 | Roberts | |
| 2005/0114811 A1 * | 5/2005 | Schultz | 716/6 |
| 2007/0245280 A1 | 10/2007 | Van Eijk et al. | |
| 2008/0184184 A1 | 7/2008 | McCracken et al. | |
| 2010/0122228 A1 | 5/2010 | McCracken et al. | |
| 2010/0162191 A1 | 6/2010 | McCracken | |

OTHER PUBLICATIONS

Zhang, Ting; Benini, Luca; De Micheli, Giovanni; "Component Selection and Matching for IP-Based Design," Mar. 13, 2001, IEEE, Design, Automation, and Test in Europe 2001.*

Hu, Bo; Shi, Richard; "Fast-Yet-Accurate PVT Simulation by Combined Direct and Iterative Methods," Dec. 19, 2005, IEEE, ICCAD 2005.*

* cited by examiner

*Primary Examiner* — Nghia Doan
*Assistant Examiner* — Eric Lee
(74) *Attorney, Agent, or Firm* — Vista IP Law Group, LLP

(57) ABSTRACT

An improved method, system, and computer program product for selecting components for an early stage electronic design is disclosed. A library of cells is modeled and is characterized by parameter combinations, where the cell modeling information is based upon ranking and scoring of the cells in the cell library. Based upon design specification information for an electronic design, the cell modeling data is used to select one or more representative cells for the early stage design based upon the list of ranked cells. The rankings provide an indication of the appropriateness of the selected cells for the early stage design. The pre-modeling of the cells provides high efficiency at run-time when there is a need to quickly select cells for the early stage design.

31 Claims, 14 Drawing Sheets

Figure 8

| Rank | PVT1 | PVT2 | PVT3 | Score |
|---|---|---|---|---|
| 1st | Cell 1 | Cell 2 | Cell 1 | 0 |
| 2nd | Cell 2 | Cell 1 | Cell 2 | 1 |
| 3rd | Cell 3 | Cell 3 | Cell 3 | 2 |

Figure 9A

| Rank | PVT1 | PVT2 | PVT3 | Score |
|---|---|---|---|---|
| 1st | Cell 1 | Cell 2 | Cell 1 | 0 |
| 2nd | Cell 2 | Cell 1 | Cell 2 | 1 |
| 3rd | Cell 3 | Cell 3 | Cell 3 | 2 |

Cell1 Score = 0 + 1 + 0 = 1

Figure 9B

| Rank | PVT1 | PVT2 | PVT3 | Score |
|---|---|---|---|---|
| 1st | Cell 1 | Cell 2 | Cell 1 | 0 |
| 2nd | Cell 2 | Cell 1 | Cell 2 | 1 |
| 3rd | Cell 3 | Cell 3 | Cell 3 | 2 |

Cell2 Score = 1 + 0 + 1 = 2

Figure 9C

| Rank | PVT1 | PVT2 | PVT3 | Score |
|------|------|------|------|-------|
| 1st  | Cell 1 | Cell 2 | Cell 1 | 0 |
| 2nd  | Cell 2 | Cell 1 | Cell 2 | 1 |
| 3rd  | Cell 3 | Cell 3 | Cell 3 | 2 |

Cell3 Score = 2 + 2 + 2 = 6

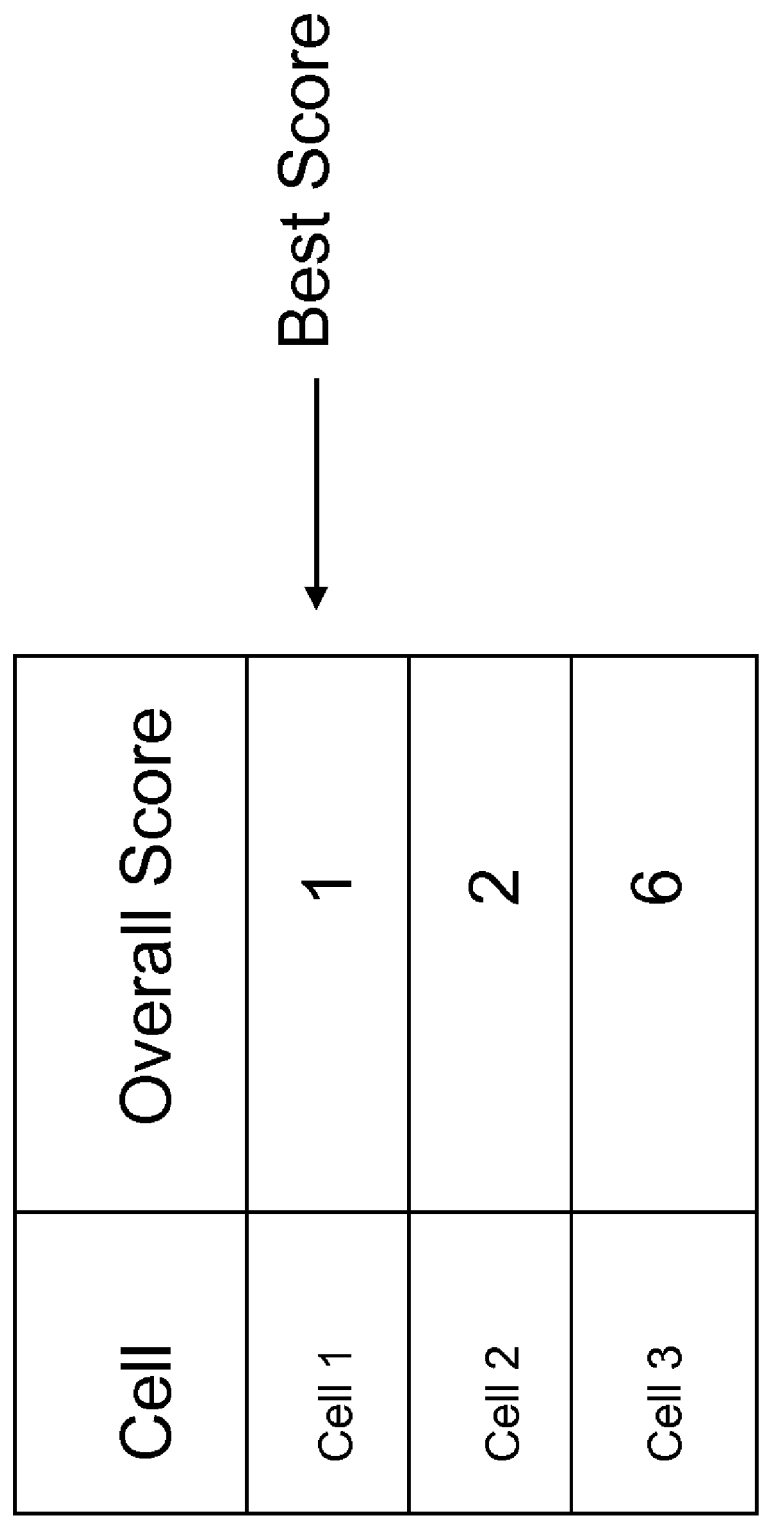

METHOD AND SYSTEM FOR PERFORMING CELL MODELING AND SELECTION

BACKGROUND

The invention is directed to an improved approach for implementing cell modeling and selection of cells for electronic designs.

An electronic design, such as the design of a semiconductor integrated circuit (IC), has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

Historically, the design of most IC chips was created from scratch. There was very little design re-use, as most design objects were newly created for each new electronics design. In recent years, re-use of design blocks and cells have become more and more prevalent in the electronics design and manufacturing industry. In many cases, a new design is no longer created from scratch. Instead, the design engineers will start from a previous design, and re-use a significant portion of the previous design to create the new electronics design. Indeed, the design engineer may re-use a vast majority of the previous design, and only add a small proportion of new logic to create the new design. In addition, the re-used portion of the new design may need to be addressed to target new process technology, which may cause new requirements in terms of performance, power, etc.

Design blocks and cells can also be used to perform early stage analysis and examinations of an electronic design. For example, the process of performing chip planning can be greatly facilitated if the designer or chip planning tool can identify specific blocks or cells that approximate actual blocks or cells that will eventually be used in the final electronic design. Similarly, the process of prototyping can achieve much more accurate results if the prototype circuit design includes blocks and cells that more closely correspond to the actual blocks and cells that will be used in the final circuit design.

However, it is difficult to efficiently and accurately select the blocks or cells that should be used in the early stage design. One of the significant challenges faced by a modern designer is the selection of the specific blocks or cells to use in the early stage design, given the large number of cells and blocks that exist which can possibly be used in the design. This is not a trivial problem given the existence of a very large number of vendors and suppliers of IP blocks in addition to the likely existence of a large number of blocks or cells that a company may have internally developed. The fact that certain designs are only available on specific manufacturing processes adds another layer of complexity in terms of selection.

The normal processes used by organizations to select blocks and cells cannot be efficiently or effectively used to select blocks and cells for early stage designs. This is because the process of generating an early stage design is quite different from the process that is typically used to create final, production-ready electronic design. Since the final electronic design must be fully manufacturable and must correctly operate for its intended functionality and design requirements, an extensive design process is normally undertaken to select exactly the right block or cell for each part of the design, and to verify that the design will manufacture correctly and will function as intended. Therefore, the goal of selecting the most optimal blocks or cells for the design is very important, and a considerable amount of time of resources can and should be taken to make sure that this choice of the design's blocks and cells are correct.

In contrast, the process of generating an early stage design must more heavily weigh the amount of time and resources it takes to select the block or cell for the design against the absolute correctness of the specific block or cell that is chosen. This is because at the early stages of the design process, e.g., for chip planning or prototyping, it is important to be able to obtain fast analysis results and not necessarily as important to utilize a design or model that exactly tracks the final end-product. Moreover, to provide even greater efficiency, the early stage design may use representative blocks/cells throughout a design, rather than specifically tailored and chosen blocks and cells as is the case for a final IC product.

SUMMARY

Embodiments of the present invention provide an improved method, system, and computer program product for selecting components for an early stage electronic design. According to some embodiments, a library of cells is modeled and is characterized by parameter combinations. The cell modeling information is based upon ranking and scoring of the cells in the cell library. Based upon design specification information for an electronic design, the cell modeling data is used to select one or more representative cells for the early stage design based upon the list of ranked cells. The rankings provide an indication of the appropriateness of the selected cells for the early stage design. The pre-modeling of the cells provides high efficiency at run-time when there is a need to quickly select cells for the early stage design.

Other additional objects, features, and advantages of the invention are described in the detailed description, figures, and claims.

BRIEF DESCRIPTION OF FIGURES

FIG. 8 shows a chart that illustrates cell rankings and scores according to some embodiments of the invention.

FIGS. 9A-D provide an illustrated example for determining an overall score and ranking for cells according to some embodiments of the invention.

DETAILED DESCRIPTION

Embodiments of the present invention provide an improved method, system, and computer program product for selecting components for an early stage electronic design. According to some embodiments, a library of cells is modeled and is characterized by parameter combinations. The cell modeling information is based upon ranking and scoring of the cells in the cell library. Based upon design specification information for an electronic design, the cell modeling data is used to select one or more representative cells for the early stage design based upon the list of ranked cells. The pre-modeling of the cells provides high efficiency at run-time when there is a need to quickly select cells for the early stage design.

Figure 1:
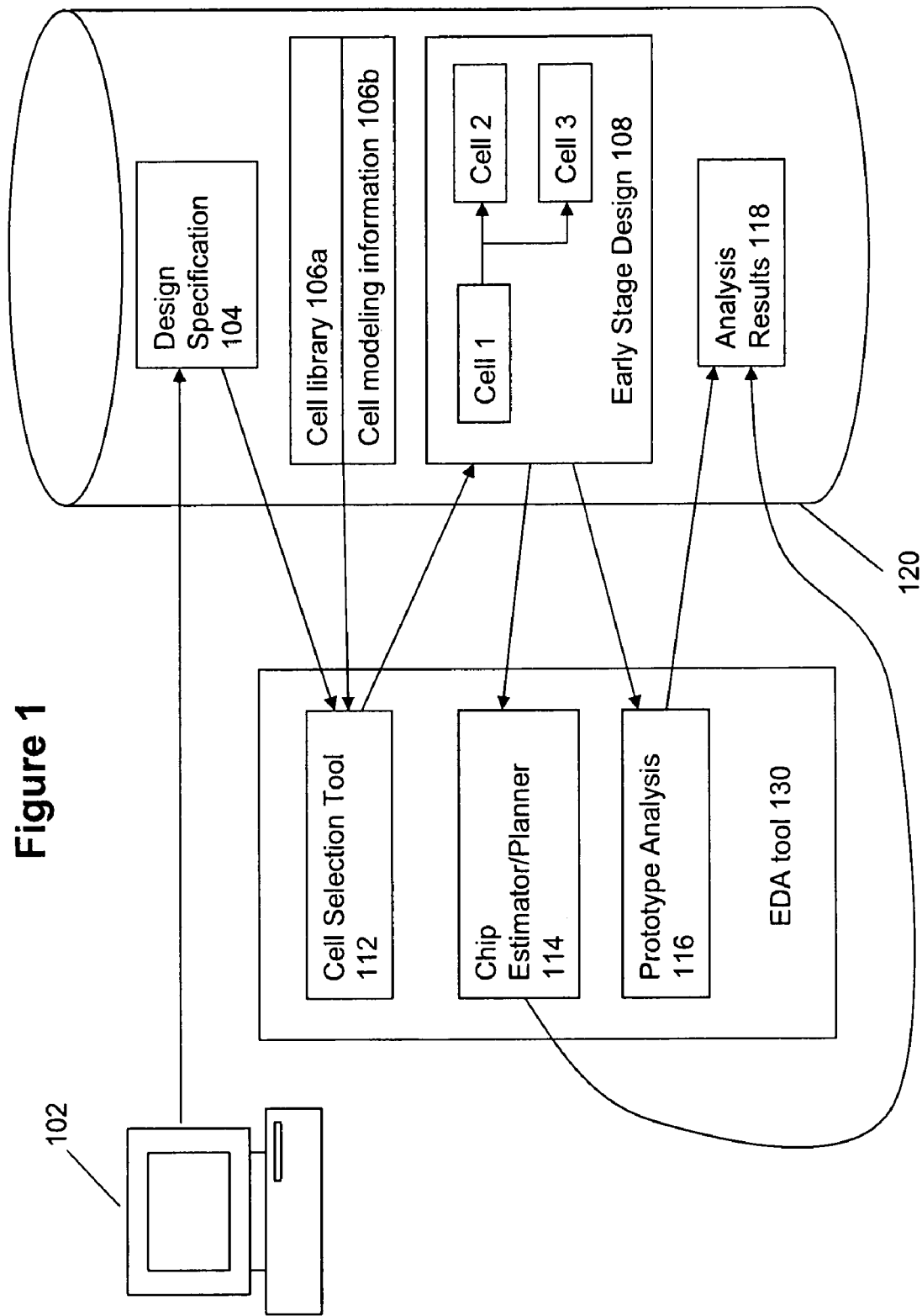
FIG. 1 depicts an architecture of a system for selecting a cell for an early stage electronic design according to some embodiments of the invention.

FIG. 1 shows an architecture of a system 100 for selecting cells for an early stage design according to one embodiments of the invention. The users at user station 102 correspond to any individual, organization, or other entity that uses system 100 for planning or designing an electronic design. The user stations 102 could be implemented using any suitable computing platform.

The user station 102 may be associated with one or more databases 120 or other computer readable medium that holds data regarding the user's electronic design and/or one or more design specifications 104 relating to the proposed electronic design. The one or more specifications 104 comprise any set of information or parameters that the user has developed to determine the requirements of the user's electronic design 106 and of cells and blocks that are needed to implement the electronic design. For example, the specification could include details of requirements for one or more IP blocks for the electronic design, such as the function, process, technology node, size, acceptable power parameters, acceptable leakage parameters, and gate count of a desired IP block.

The one or more databases 120 include a cell library 106a that stores information about the different cells and blocks that are subject to use by the user at user station 102 for an electronic design. The information in the cell library 106a is characterized and used to generate cell modeling information 106b that specifies the appropriateness of the different cells and blocks at different processing conditions. A cell selection module 112 within an EDA tool 130 uses the cell library 106a and cell modeling information 106b to generate an early stage electronic design 108 that incorporates representative cells from the cell library 106a.

There are numerous reasons for a user to want to select specific cells from a cell library 106a for an early stage electronic design 108. For example, one possible purpose of the cell selection is to generate data for a chip estimator/planning tool 114. The chip estimator/planner 114 provides a planning tool to plan, outline, and analyze the characteristics and production requirements of an electronic product. For example, the chip planner 114 could provide an early stage estimation of anticipated production characteristics to an electronic product by analyzing the specifications and requirements of the design specification 104. By analyzing the functional and physical requirements of the early stage electronic design 108 that is based upon the design specification 104, the chip estimator/planner 114 provides users with analysis results 118 that could include an estimate of the chip size, power, leakage and cost of the final electronic product. The analysis results 118 provide the users of the chip estimator/planner 114, such as IC design teams, system architects and management, with the ability to visualize tradeoffs throughout the chip design flow. By bringing IP and manufacturing data to bear on the earliest stage of chip planning, the chip planner 114 enables earlier and more informed decision-making in the context of critical decisions affecting chip performance, functionality and cost. The chip planner 114 helps design teams explore a wide range of chip architecture options in literally seconds including selection of IP, technology nodes and processes, power optimization strategies, packaging and much more.

In operation, the user at user station 102 provides the chip planner 114 with a high-level design specification 104, including information such as gate counts, performance goals, off-chip bus connections, memory configurations and optional connectivity. The cell selector 112 will then use the cell modeling information 106b to select cells or IP blocks from the cell library 106a for inclusion into the early stage design 108. Based upon these selected cells and other early stage design parameters, the chip planner 114 will produce a datasheet with estimations of the final silicon product, including information such as die area, performance, power, leakage, yield, package recommendations, and production chip cost. An exemplary chip planner 114 is available from Cadence Design Systems, Inc. of San Jose, Calif., with further information available at the following websites: www.chipestimate.com or www.cadence.com.

Another possible reason to select specific cells from a cell library 106a for an early stage electronic design 108 is to perform prototyping of electronic designs. For example, RTL prototyping may be used to create a prototype of the physical implementation of an electronic design. Some example information that can be captured in the prototype includes performance, power and area information for the design. The goal of the prototyping analysis 116 is to perform early analysis to generate analysis results 118 that can be used to project whether the function of the electronic design 108 will work properly for its intended and expected purpose(s) under anticipated and legal operating, physical, and input conditions. The prototype also ties into being able to perform architectural analysis and embedded software development earlier in the design cycle as well.

It is important to be able to quickly and efficiently generate the analysis results 118, especially when performing early stage analysis of designs. This is especially important if the user has many different possible designs that need to be compared against each other, and so the analysis of each design should not individually consume an excessive amount of time or resources. However, the analysis results 118 should still be accurate enough such that it can be relied upon to guide the user in his/her design activities. The selection of the specific cells used in the early stage design 108 has a great impact upon the accuracy and usefulness of the analysis results 118. The cell modeling information 106b of the present invention provides this ability to quickly and accurately select the representative cells for the early stage design 108 that allows precise analysis results to be generated at the early stages of the electronic design process.

Figure 2:
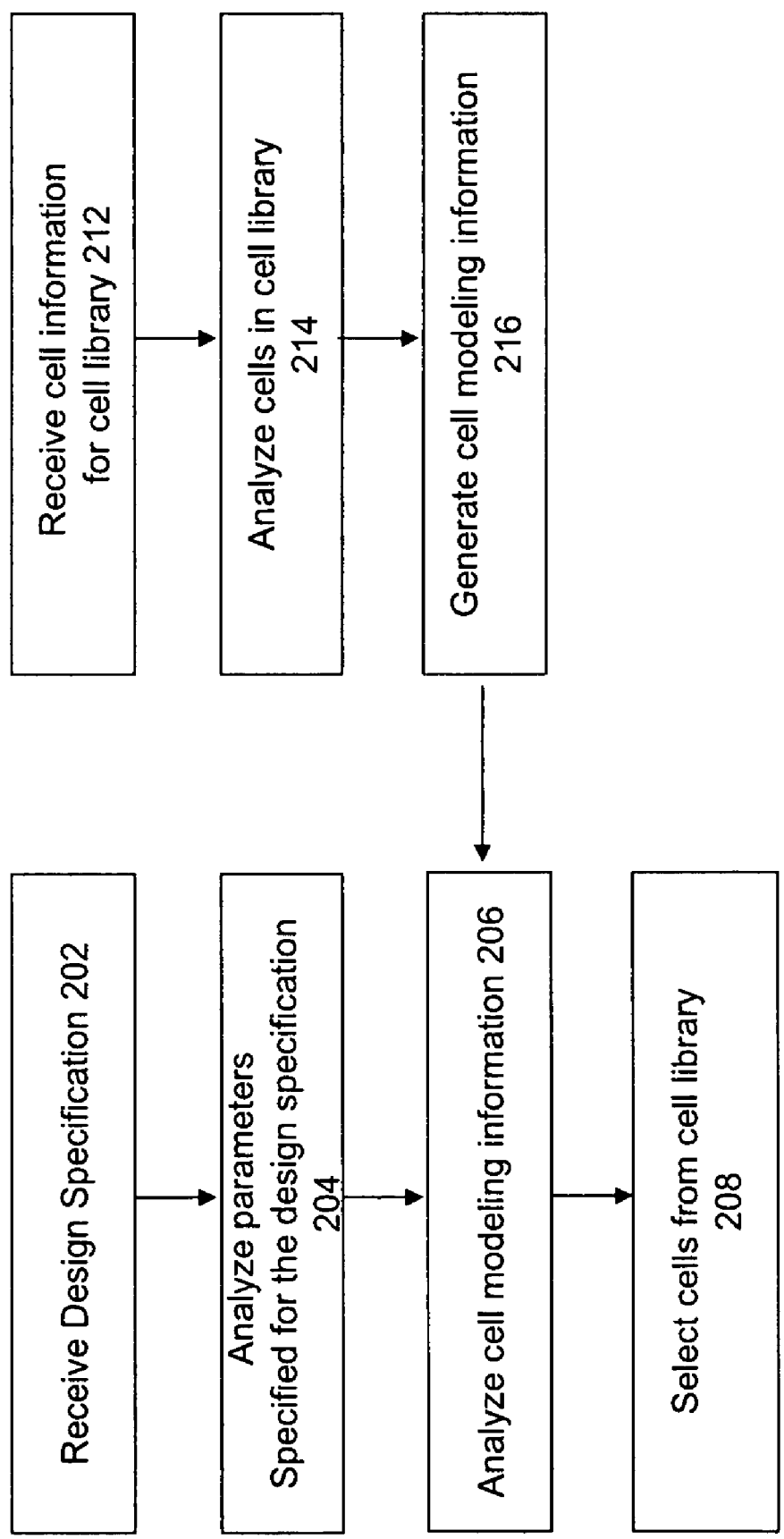
FIG. 2 illustrates a flow of an approach for selecting a representative cell according to some embodiments of the invention.

FIG. 2 shows a flow of a process for selecting cells for an early stage electronic design according to some embodiments of the invention. The actions along the right-hand side of the flowchart are performed ahead of time to set up the cell modeling information. Setting up this information in advance is one of the reasons that the present embodiments of the invention can quickly generate an early stage design for analysis at run-time. The actions along the left-hand side of the flowchart are performed to implement cell selection.

At 212, raw library information is received for design cells. The cell information is characterized by numerous processes, voltages, temperatures, and other parameters and node combinations. A library may include information for many thousands of cells that can possibly be used in a given electronic design. The challenge is to be able to reduce this mass of information into data that is useful for cell selection.

At 214, the information for the cells in the cell library is analyzed using multi-corner analysis. For example, the cell data is analyzed at different PVT (process-voltage-temperature) combinations based upon the suitability and desirability of the cells at those particular PVTs. Weights may be applied to the analysis results for particular emphasis upon specific processing, environmental, or manufacturing considerations. Thereafter, at 216, cell modeling information is generated and stored in a database or other computer readable medium.

When the EDA tool needs to make a cell selection, then at 202, the design specification is received for analysis. As noted above, the design specification could include details of requirements for one or more components for the electronic design, such as the function, process, technology node, size, acceptable power parameters, acceptable leakage parameters, and gate count of a desired component. At 204, these parameters specified in the design specification are reviewed and analyzed to filter and drive the selection of the appropriate cells from the cell library. For example, the design specification may specify a particular process that will be used to manufacture the electronic product, which will filter out the cells in the cell library associated with other processes. The design specification will also be useful to identify the cells related to specific functionality (e.g., NAND gates, flip-flop, NAND2, scan flip-flop, state retention flip-flop, state retention scan flip-flop, level shifter (such as high-to-low, low-to-high, and bidirectional), isolation cell, power switch, ground switch, and/or always-on-buffer) that will be used to represent the anticipated design.

At 206, the cell modeling information is retrieved from its storage location and analyzed to identify candidate cells which match the basic requirements of the design specification. The cell modeling information comprises information that enables a fast match between the requirements of the design and the pre-analyzed characterization of the cell information. Thereafter, at 208, specific cells are selected from the cell library that are deemed to be most appropriate to be representative in the early stage design for the electronic product.

Figure 3:
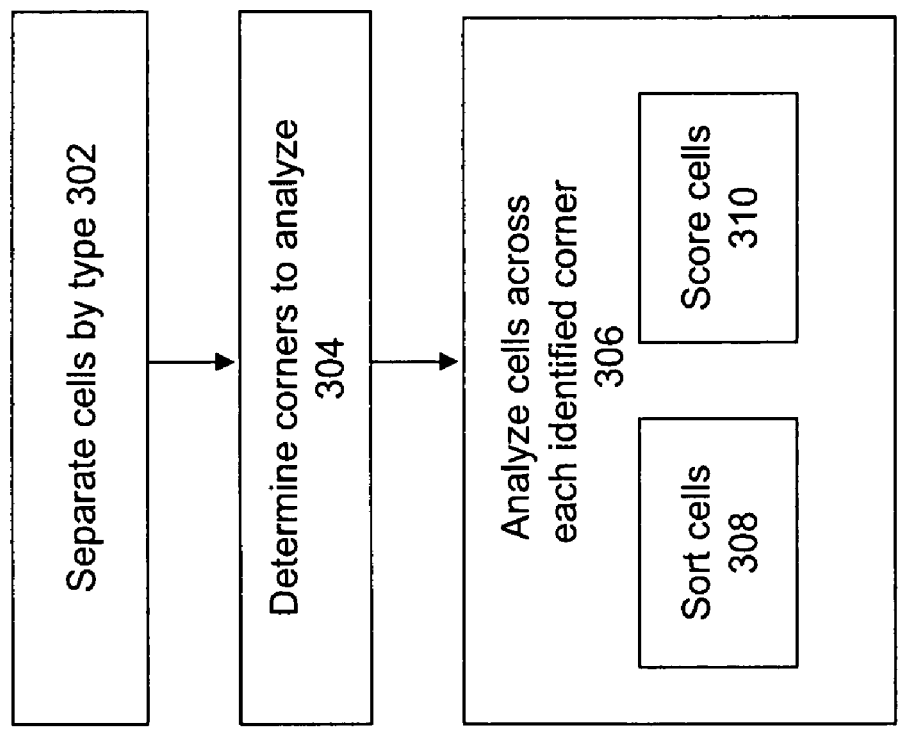
FIG. 3 illustrates a flow of an approach for analyzing cells according to some embodiments of the invention.

FIG. 3 shows a high level flow of a process for analyzing cell data to generate cell modeling information. At 302, the cells in the cell library are categorized based upon their function type. For example, the cells can be categorized as flip-flop cells, NAND2 cells, and other cells of specified functionality.

Next, the corners for analysis are selected at 304. According to some embodiments, of the invention, this action identifies the specific PVTs for which cells are to be analyzed. The PVT corners are selected based upon different processing, manufacturing, or functionality parameters. For example, a PVT corner could be selected for timing performance, another PVT corner selected for power performance, and yet another PVT corner selected for leakage. Any suitable approach can be taken to select the specific PVT corners. According to one embodiment, the PVT for worst timing is selected based upon identifying a gate to analyze, determining the average delay of that gate at every PVT, assuming the same load. The PVT associated with the worst delay is selected for the multi-corner analysis. Similarly, the PVT relating to power performance can be selected by identifying the PVT of the worst power performance considering the internal cell power, leakage power, and switching power of cells at different PVTs, where consideration is made of both active and leakage powers.

At 306, the cells in the library of a given type are analyzed across the identified PVT corners. This is done at 308 by sorting the cells within each PVT according to the cell's rank relative to other cells. In addition, at 310, scores are assigned to the cells for each PVT. Any suitable approach can be taken to rank and sort the cells for a given PVT. In addition, any suitable scoring methodology may be employed within the scope of the invention.

Figure 4:
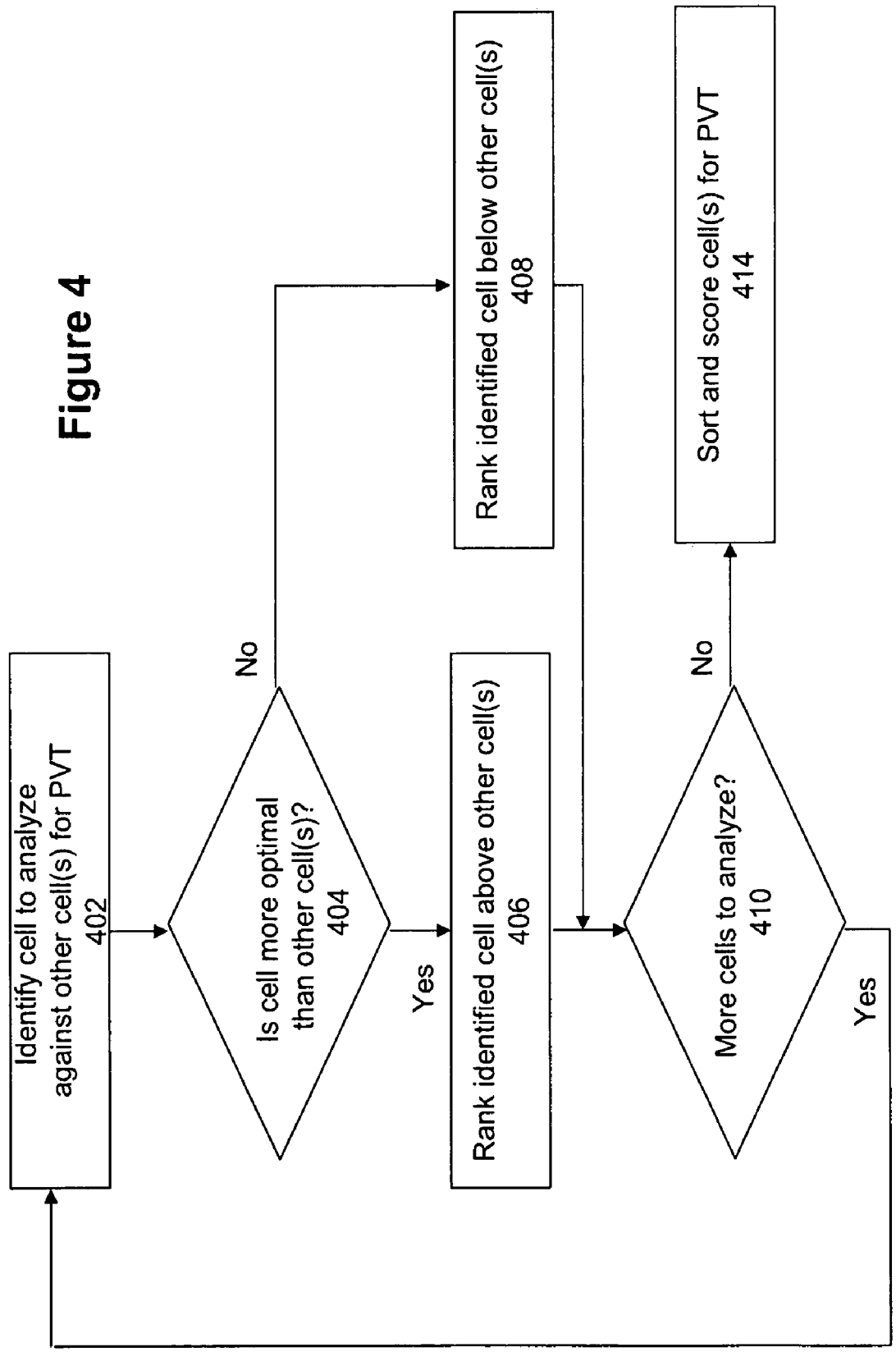
FIG. 4 illustrates a flow of an approach for ranking cells within a corner according to some embodiments of the invention.

FIG. 4 illustrates a process for sorting cells in a PVT according to some embodiments of the invention. At 402, a cell is identified for analysis against other cells for the PVT. A determination is made at 404 whether the cell is more or less optimal than the other cells at that particular PVT. More details about a possible approach to make this determination is described below with respect to FIG. 5.

If the cell under examination is more optimal than other cells, then at 406 it is ranked above the other cells. If, however, the cell is less optimal than the other cells, then at 408 it is ranked below the other cells.

A determination is made at 410 whether there are any other cells to analyze. If so, then the process returns back to 402 to analyze another cell. If there are no further cells to analyze for the PVT, the cells for the PVTS proceed further to 414 for final sorting and scoring.

Figure 5A:
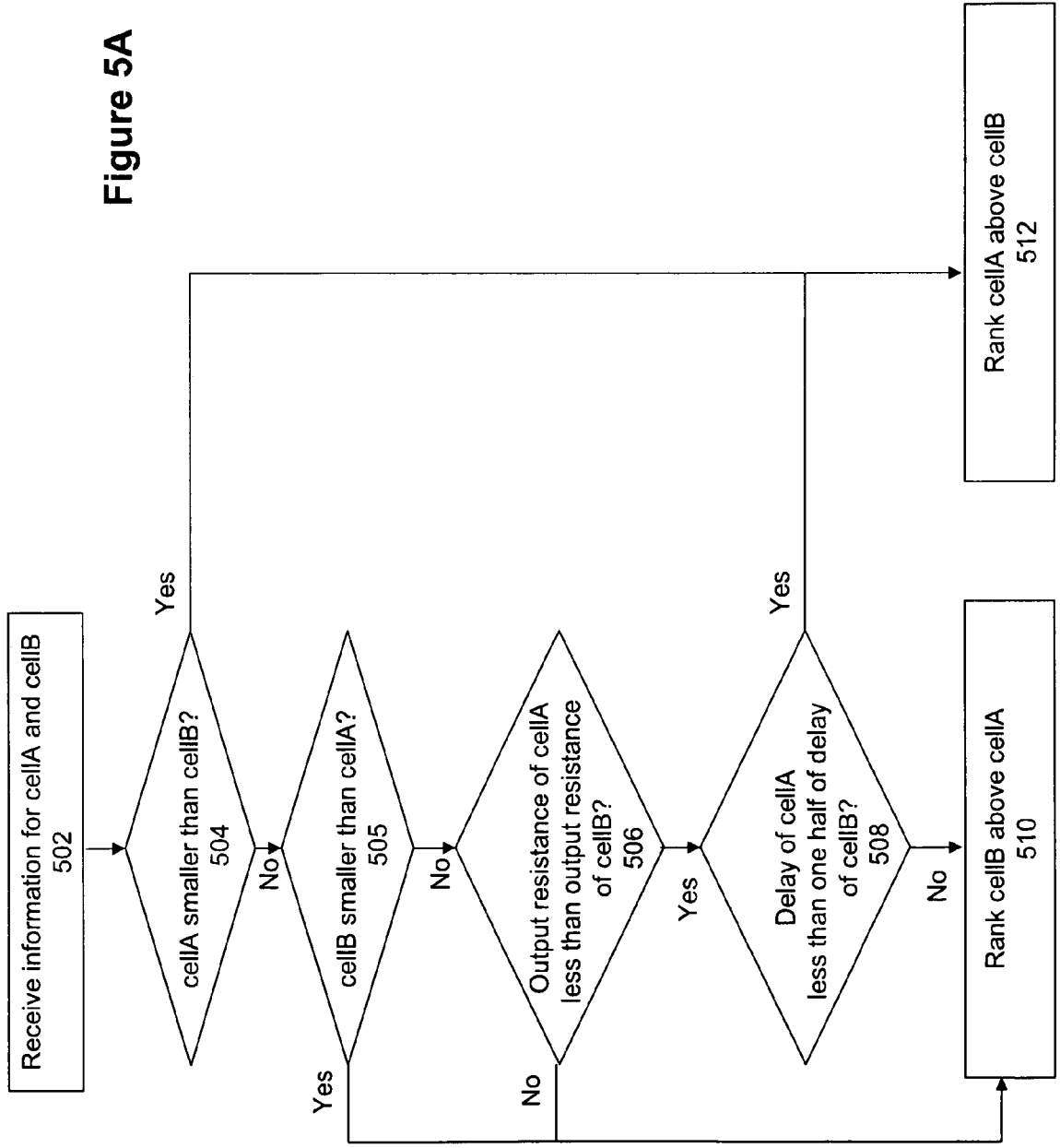
FIGS. 5A-B illustrate flows of approaches for comparing two cells according to some embodiments of the invention.

FIG. 5A describes an example approach for ranking cells within a PVT. The approach of FIG. 5A is employed in the sorting context, in which two cells are compared against each other to sort them, where the cells within the PVT may need to be compared against numerous other cells in the PVT list to order to determine a final ranking order for all of the cells. At 502, information is received for two cells to be compared against each other (i.e., cellA and cellB). The received information comprises the data that is needed to adequately compare the two cells based upon the desired electrical or physical parameters for the cells. For example, the received information comprises the size of the each cell, the output resistance of each cell, and the delay associated with each cell.

According to the present embodiment of the invention, the size of the cell is a determining factor when deciding the relative merit between two cells. In particular, according to the present embodiment, a smaller cell is always ranked higher than a larger cell. Therefore, at 504, a determination is made whether cellA is smaller than cellB. If cellA is smaller than cellB, then at 512, cellA is ranked above cellB. At 505, a determination is made whether cellB is smaller than cellA. If cellB is smaller than cellA, then at 510, cellB is ranked above cellA. It is noted that other embodiments can be implemented which do not rely upon the size of the cell as the determining factor. Instead, the alternative embodiments utilize cell size as just one factor among other factors that in combination determine the relative rank between two cells.

If cellA is not smaller than cellB and cellB is also not smaller than cellA, this means that the sizes of the two cells are equal. Therefore, other factors are used to determine the relative ranking between the two cells. According to the present embodiment, the relative output resistance and delay of the two cells can be used in combination to determine whether cellA should be ranked higher than cellB. A cell that is both faster and has better driver strength than another cell should be ranked higher. However, it is possible that a cell is faster than another cell, but has lower drive strength. Similarly, it is possible that a cell is slower than another cell, but has higher drive strength.

The present embodiment balances both of these factors by determining at 506 whether the output resistance of cellA is less than the output resistance of cellB. If the output resistance of cellA is less than the output resistance of cellB, then at 510, cellB is ranked higher than cellA.

If, however, the output resistance of cellA is not less than the output resistance of cellB, then a further determination is made at 508 whether the delay of cellA is less than half the delay of cellB. If so, then at 512, cellA is ranked higher than cellB. Otherwise, at 510, cellB is ranked higher than cellA.

Figure 5B:
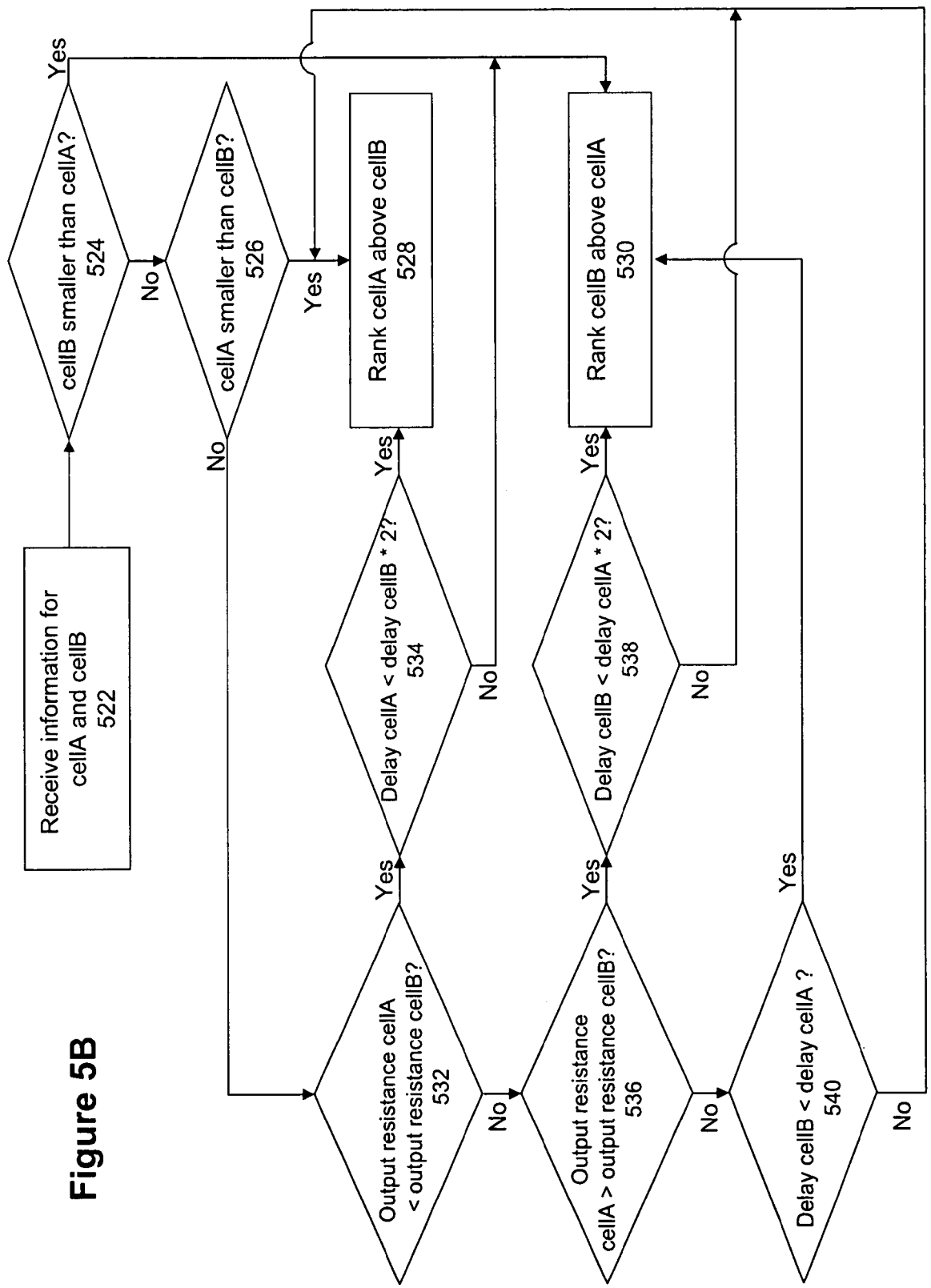

FIG. 5B describes another example approach for ranking cells within a PVT, where the approach is employed in the sorting context. At 522, information is received for two cells to be compared against each other (i.e., cellA and cellB). As before, the received information comprises the data that is needed to adequately compare the two cells based upon the desired electrical or physical parameters for the cells. For example, the received information comprises the size of the each cell, the output resistance of each cell, and the delay associated with each cell.

According to the present embodiment of the invention, the size of the cell is a determining factor when deciding the relative merit between two cells where a smaller cell is always ranked higher than a larger cell. Therefore, at 524, a determination is made whether cellB is smaller than cellA. If cellB is smaller than cellA, then at 530, cellB is ranked above cellA. Similarly, at 526, a determination is made whether cellA is smaller than cellB. If cellA is smaller than cellB, then at 528, cellA is ranked above cellB.

If cellA is not smaller than cellB, this means that the sizes of the two cells are equal. Therefore, other factors are used to determine the relative ranking between the two cells. According to the present embodiment, the relative output resistance and delay of the two cells can be used in combination to determine whether cellA should be ranked higher than cellB.

At 532, a determination is made whether the output resistance of cellA is less than the output resistance of cellB. If so, then a further determination is made as to whether the delay of cellA is less than two times the delay of cellB. If the answer is true, then cellA is ranked above cellB at 528. If the answer is not true, then cellB is ranked above cellA at 530.

If the determination of 532 is that the output resistance of cellA is not less than the output resistance of cellB, then at 536, another determination is made whether the output resistance of cellA is greater than the output resistance of cellB. If so, then a further determination is made regarding whether the delay of cellB is less than two times the delay of cellA. If the answer is true, then cellB is ranked above cellA at 530. If the answer is not true, then cellA is ranked above cellB at 528.

If the determination of 536 is that the output resistance of cellA is not greater than the output resistance of cellB, then at 540, another determination is made whether the delay of cellB is less than the delay of cellA. If the answer is true, then cellA is ranked above cellB at 528. If the answer is not true, then cellB is ranked above cellA at 530.

Figure 6:
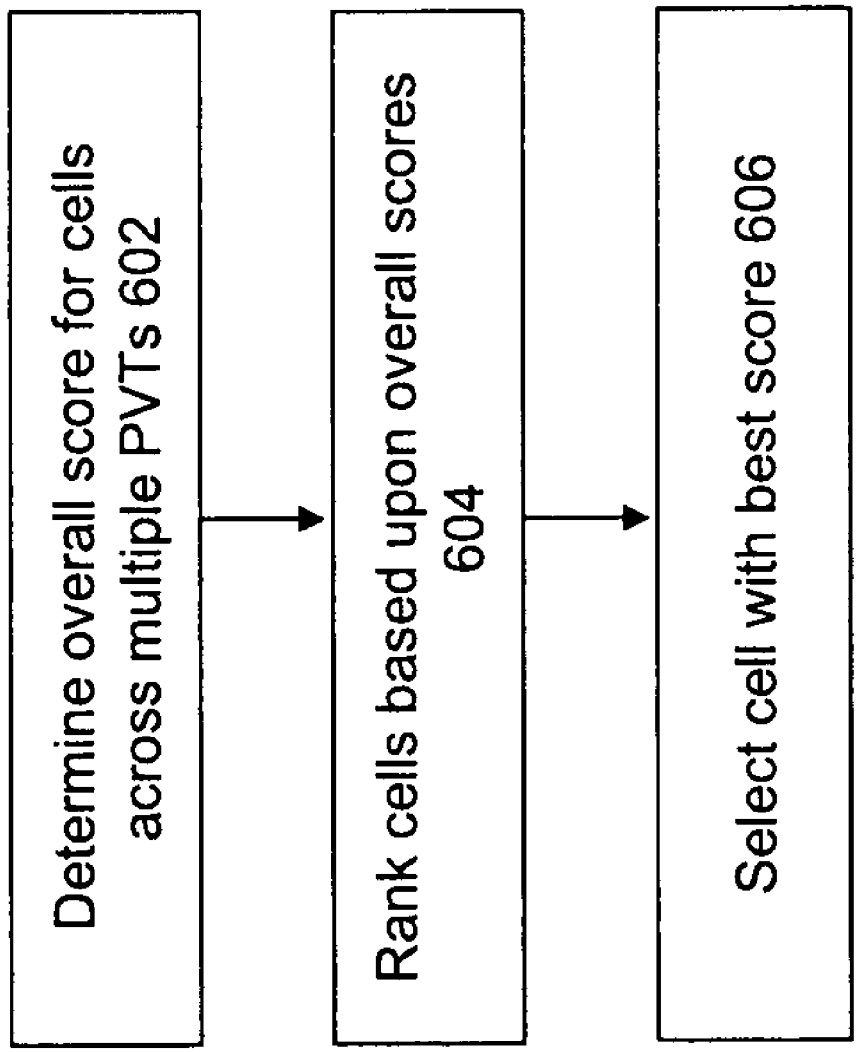
FIG. 6 illustrates a flow of an approach for determining an overall score and selecting a cell based upon an overall score according to some embodiments of the invention.

FIG. 6 shows a process for selecting a representative cell across multiple PVTs. At 602, a determination is made of the overall score for the cells across multiple PVT corners. Any suitable approach can be taken to determine the overall score. According to one embodiment, the scores for the cell at each PVT are simply summed together.

At 604, the cells are then ranked based upon their overall scores. This action can be implemented by comparing and ranking the cells across all the PVTs based upon their overall scores. The cell with the best overall score can then be selected at 606.

Figure 7:
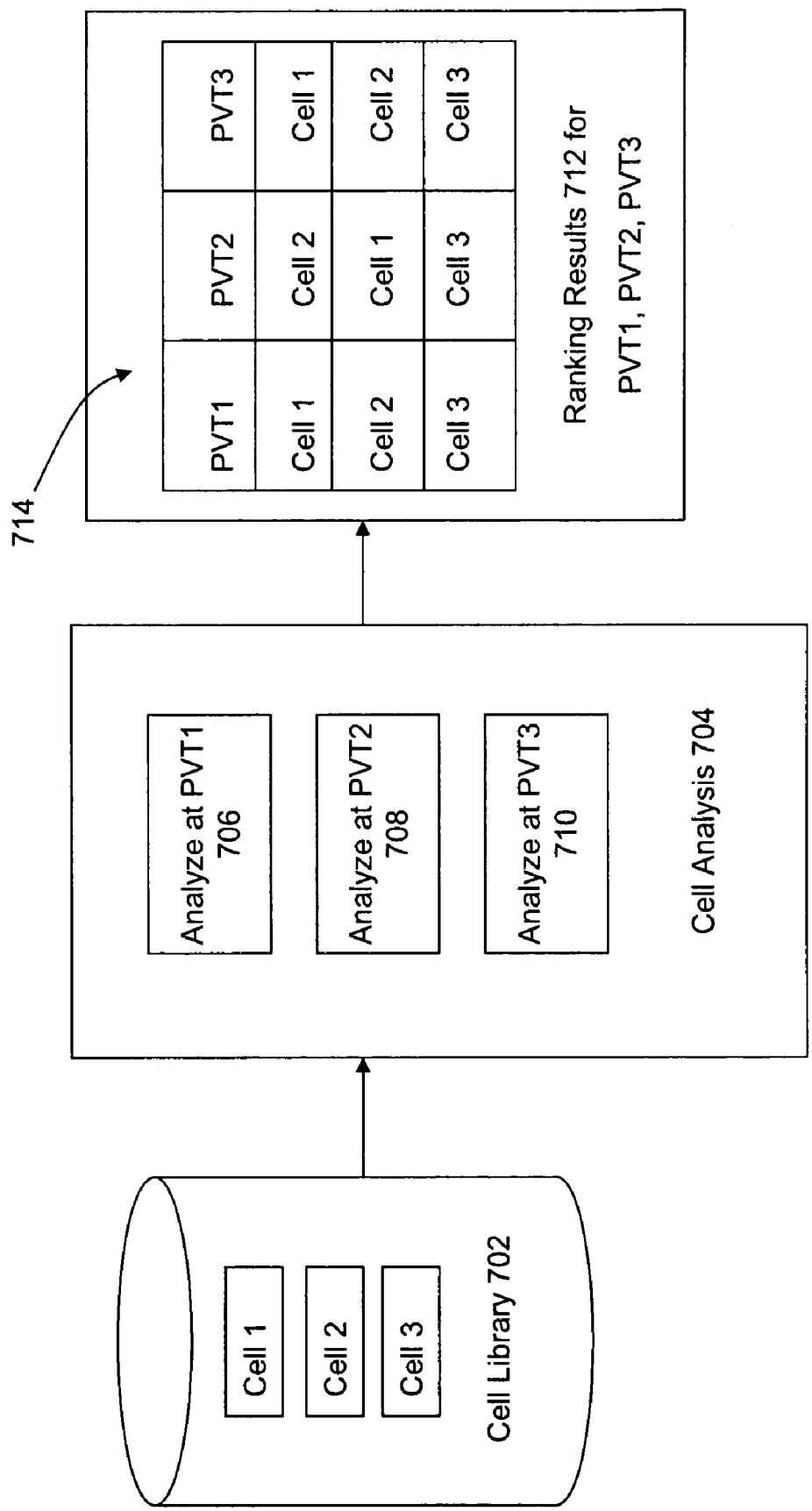
FIG. 7 provides an illustrated example for ranking cells across multiple PVTs according to some embodiments of the invention.

FIG. 7 provides an illustrative example of the above-described process for ranking a set of cells within certain PVTs. This figure shows a cell library 702 that includes information about three cells Cell1, Cell2, and Cell3. Assume that the three cells correspond to the same functionality and should be analyzed against each other. Further assume that the three PVTs have been selected for the analysis and ranking of the cells, including PVT1, PVT2, and PVT3.

During cell analysis 704, each cell is analyzed at each PVT. Therefore, cell1, cell2, and cell3 are all analyzed and ranked for PVT1 at 706. Similarly, cell1, cell2, and cell3 are all analyzed and ranked for PVT2 at 708 and cell1, cell2, and cell3 are analyzed and ranked for PVT3 at 710.

Ranking results 712 shows a chart 714 that displays the relative rankings for each cell for each PVT. In this example, for PVT1, cell1 is ranked highest, followed by cells2, and then cell3. For PVT2, cell2 is ranked the highest, followed by cell1, and then cell3. For PVT3, cell1 is ranked highest, followed by cells2, and then cell3.

FIG. 8 is a reproduction of chart 714 that further displays an association between a cell's ranking and that cell's score within a PVT. Here, the chart includes an additional column 802 that identifies the relative rank of a cell within a PVT. This column 802 confirms that a cell in the top row 806 is ranked first, a cell in the second row 808 is ranked second, and a cell in the third row 810 is ranked third.

Another column 804 displays the score that is associated with a cell in a particular ranking row. In the present embodiment, a low score corresponds to a higher ranking. Here, it can be seen that a cell in the top row 806 associated with a cell that is ranked first has a score of "0". A cell in the second row 808 associated with a cell that is ranked second has a score of "1". Finally, a cell in the bottom row 810 associated with a cell that is ranked third has a score of "2".

FIGS. 9A-D illustrate an approach to determine the overall score for each based upon the individual rankings and scoring for the cells across the multiple PVTs.

FIG. 9A illustrates the calculation of an overall score for cell1. Here, cell1 is associated with a score of "0" for PVT1, a score of "1" for PVT2, and a score of "0" for PVT3. Therefore, an overall score for cell1 can be calculated from these individual scores as follows:

Cell1 Score=PVT1 cell1 score+PVT2 cell1 score+ PVT cell1 score=0+1+0=1

FIG. 9B illustrates the calculation of an overall score for cell1. Here, cell2 is associated with a score of "1" for PVT1, a score of "0" for PVT2, and a score of "1" for PVT3. Therefore, an overall score for cell2 can be calculated from these individual scores as follows:

Cell2 Score=PVT1 cell2 score+PVT2 cell2 score+
PVT cell2 score=1+0+1=2

FIG. 9C illustrates the calculation of an overall score for cell3. Here, cell3 is associated with a score of "2" for PVT1, a score of "2" for PVT2, and a score of "2" for PVT3. Therefore, an overall score for cell3 can be calculated from these individual scores as follows:

Cell3 Score=PVT1 cell3 score+PVT2 cell3 score+PVT
cell3 score=2+2+2=6

FIG. 9D shows a chart that compares the overall scores for cell1, cell2 and cell3. In the present embodiment, the cell having the lowest overall scoring value corresponds to the highest overall ranking. Here it can be seen that cell1 has the lowest overall score value of "1", followed by cell2 with an overall score value of "2", with cell3 having the worst overall score value of "6". Therefore, in this example, cell1 would be ranked the highest and would be selected as the representative cell for the early stage design.

Alternative embodiments of the invention can utilize other approaches for calculating the scores of cells within a PVT. Instead of using the integer-based scores as described above, a less granular approach could use a score that is more directly tied to the actual amount of the performance or physical difference between two cells. For example, if a first cell is ranked higher than a second cell because it has a 1% better delay value for a particular PVT, then the score of the first cell can be set 1% higher than the second cell within the PVT. If the second cell is ranked higher than a third cell because it has a 10% better delay value for the PVT, then the second cell can be associated with a score that is 10% higher than the third cell.

In addition, weighting can be used to emphasize the importance or significance of one set of PVT scores over another set of PVT scores. For example, assume that the conditions for PVT1 are 60% more likely to occur or be relevant for a design as compared to the conditions for PVT2. In this situation, the scores for the cells in PVT1 and/or PVT2 can be weighted to reflect the 60% greater emphasis upon the scoring values for cells in PVT1 upon the overall scores for those cells.

The cell modeling information may comprise multiple sets of ranking data that can be used differently at run-time depending upon the parameters of the design specification and/or user selections. For example, assume that a first set of weighting is used to emphasize power performance, which results in a set of overall rankings for PVTs where cell1 is ranked the highest. Further assume that a second set of weightings are used to emphasize leakage minimization, which results in a set of overall rankings where cell2 is ranked the highest. This modeling information for the two ranking results can be maintained in the database. If the user presents a design specification where power is emphasized, then cell1 can immediately be chosen as the representative cell. On the other hand, if the user presents a design specification which emphasizes leakage, then cell12 can be chosen as the representative cell.

Therefore, what has been described is an improved approach for characterizing cell data as cell modeling information, which greatly facilitates the efficient and accurate selection of cells for early stage design activity.

System Architecture Overview

Figure 10:
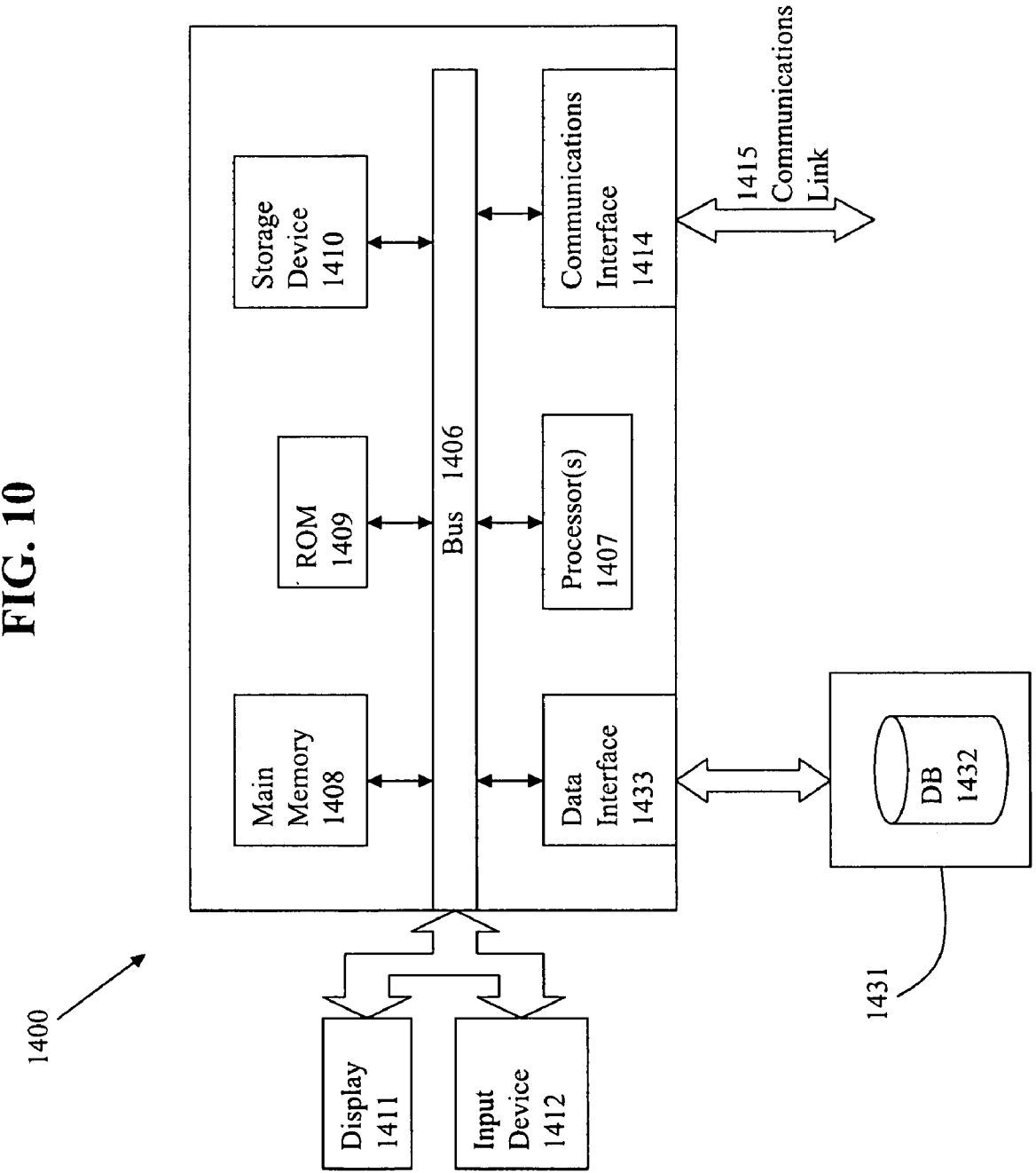
FIG. 10 shows an architecture of an example computing system with which the invention may be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer program product that includes a non-transitory computer readable medium, the computer readable medium comprising a plurality of computer instructions which, when executed by a processor, cause the processor to execute a process for selecting a representative cell for an electronic design, the process comprising:

receiving cell information for multiple cells across multiple corners;

analyzing the cell information to score two or more of the multiple cells within a corner of the multiple corners, wherein scoring the two or more of the multiple cells is performed without using a set of early design parameters for the electronic design;

generating an overall score across multiple corners for a cell of the two or more of the multiple cells;

analyzing the set of early-stage design parameters for the electronic design against the overall score; and selecting the representative cell from the two or more cells for an early stage electronic design based at least in part upon analysis of the early-stage design parameters against the overall score, in which the process for selecting a representative cell weighs an amount of time and resources it takes to select the representative cell against a greater degree of correctness.

2. The computer program product of claim 1 in which the two or more cells are ranked within the corner of the multiple corners.

3. The computer program product of claim 2 in which the ranking of a cell in the corner corresponds to the score for the cell.

4. The computer program product of claim 3 in which the score for the cell is an integer number corresponding to the ranking for the cell.

5. The computer program product of claim 2 in which the ranking of a cell in the corner is based on the size, output resistance, or delay associated with the cell.

6. The computer program product of claim 1 in which the corner comprises a set of process, voltage, and temperature (PVT) parameters.

7. The computer program product of claim 6 in which the PVT for different corners are selected for different performance attributes.

8. The computer program product of claim 1 in which weighting is applied to emphasize scores for one corner over another corner.

9. The computer program product of claim 1 in which the two or more of the multiple cells are scored in proportion or are weighted to a difference in performance between the two or more cells.

10. The computer program product of claim 1 in which early stage design is used for chip planning, chip estimation, or prototyping.

11. The computer program product of claim 1 in which the overall scoring is generated to pre-model the two or more cells so that cell selection is performed at run-time but modeling of the two or more cells is not performed at run-time.

12. The computer program product of claim 1 further comprising categorizing cells by function, selecting the multiple corners, and analyzing the cells for the multiple corners.

13. The computer program product of claim 1 in which a cell is associated with different overall scores based on different analysis emphasis, where the cell may be selected for a first design having a first performance emphasis and not selected for a second design having a second performance emphasis.

14. A computer implemented method for selecting a representative cell for an electronic design, the process comprising:

receiving cell information for multiple cells across multiple corners;

analyzing the cell information to score two or more of the multiple cells within a corner of the multiple corners wherein scoring the two or more of the multiple cells is performed without using a set of early design parameters for the electronic design;

generating, by using a processor, an overall score across multiple corners for a cell of the two or more of the multiple cells;

analyzing the set of early-stage design parameters for the electronic design against the overall score; and selecting the representative cell from the two or more cells for an early stage electronic design based at least in part upon analysis of the early-stage design parameters against the overall score, in which the process for selecting a representative cell weighs an amount of time and resources it takes to select the representative cell against a greater degree of correctness.

15. The method of claim 14 in which the two or more cells are ranked within the corner of the multiple corners.

16. The method of claim 15 in which the ranking of a cell in the corner corresponds to the score for the cell.

17. The method of claim 15 in which the ranking of a cell in the corner is based on the size, output resistance, or delay associated with the cell.

18. The method of claim 14 in which the corner comprises a set of process, voltage, and temperature (PVT) parameters.

19. The method of claim 14 in which weighting is applied to emphasize scores for one corner over another corner.

20. The method of claim 14 in which early stage design is used for chip planning, chip estimation, or prototyping.

21. The method of claim 14 in which the overall scoring is generated to pre-model the two or more cells so that cell selection is performed at run-time but modeling of the two or more cells is not performed at run-time.

22. The method of claim 14 in which a cell is associated with different overall scores based different analysis emphasis, where the cell may be selected for a first design having a first performance emphasis and not selected for a second design having a second performance emphasis.

23. A system for characterizing a cell for an electronic design, the process comprising:

one or more non-transitory computer readable medium storing cell information; and a cell modeling tool that receives cell information for multiple cells across multiple corners, wherein the cell information is analyzed to score two or more of the multiple cells within a corner of the multiple corners, wherein scoring the two or more of the multiple cells is performed without using a set of early design parameters for the electronic design and which generates an overall score across multiple corners for a cell of the two or more of the multiple cells, wherein the overall score is stored in the one or more non-transitory computer readable medium, the overall score usable for analyzing the set of early-stage design parameters for the electronic design against the overall score to select a representative cell from the two or more cells for an early stage electronic design, in which the process for selecting a representative cell weighs an amount of time and resources it takes to select the representative cell against a greater degree of correctness.

24. The system of claim 23 in which the two or more cells are ranked within the corner of the multiple corners.

25. The system of claim 24 in which the ranking of a cell in the corner corresponds to the score for the cell.

26. The system of claim 24 in which the ranking of a cell in the corner is based on the size, output resistance, or delay associated with the cell.

27. The system of claim 23 in which the corner comprises a set of process, voltage, and temperature (PVT) parameters.

28. The system of claim 23 in which weighting is applied to emphasize scores for one corner over another corner.

29. The system of claim 23 in which early stage design is used for chip planning, chip estimation, or prototyping.

30. The system of claim 23 in which the overall scoring is generated to pre-model the two or more cells so that cell selection is performed at run-time but modeling of the two or more cells is not performed at run-time.

31. The system of claim 23 in which a cell is associated with different overall scores based different analysis emphasis, where the cell may be selected for a first design having a first performance emphasis and not selected for a second design having a second performance emphasis.

* * * * *